(12) United States Patent
Thor et al.

(10) Patent No.: US 8,097,842 B2
(45) Date of Patent: Jan. 17, 2012

(54) HIGH RESOLUTION SINGLE TRACK OPTICAL ENCODER

(75) Inventors: Chung Min Thor, Riduzan (MY); Gim Eng Chew, Perak (MY); Chee Wai Ng, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 423 days.

(21) Appl. No.: 12/475,536

(22) Filed: May 31, 2009

(65) Prior Publication Data

US 2010/0301195 A1    Dec. 2, 2010

(51) Int. Cl.
*G01D 5/34* (2006.01)

(52) U.S. Cl. .............................. 250/231.13; 250/231.16

(58) Field of Classification Search ............. 250/231.13, 250/231.16, 231.18, 221; 341/11, 13
See application file for complete search history.

(56) References Cited

U.S. PATENT DOCUMENTS

| | | | |
|---|---|---|---|
| 4,654,525 A * | 3/1987 | Ebina et al. | ............. 250/231.14 |
| 5,148,020 A | 9/1992 | Machida | |
| 6,727,493 B2 | 4/2004 | Franklin et al. | |
| 7,145,128 B2 | 12/2006 | Tanaka | |
| 7,276,687 B2 | 10/2007 | Okada | |
| 7,449,675 B2 | 11/2008 | Chong et al. | |

* cited by examiner

Primary Examiner — Que T Le

(57) ABSTRACT

Disclosed are various embodiments of a single track reflective optical encoder featuring increased spatial resolution, reduced cross-talk between adjoining photodiodes, and increased amplitude output signals from individual photodiodes. With respect to prior art single track optical encoders, some photodiodes are removed from a photodiode array, while nevertheless maintaining appropriate phase relationships between pairs of A and A\, and B and B\, photodiodes. Such a configuration of photodiodes results in increased inter-photodiode spacing, and thereby permits spatial resolution to be increased while boosting current outputs from individual photodiodes. The single track optical encoder configurations disclosed herein permit very high resolution reflective optical encoders in small packages to be provided. In addition, the single track configuration reduces problems with misalignment between code scales and light detectors, permits relatively simple electronic circuitry to be used to process outputs, and reduces manufacturing, assembly, integrated circuit and encoder costs. Methods of making and using such optical encoders are also disclosed.

23 Claims, 8 Drawing Sheets

HIGH RESOLUTION SINGLE TRACK OPTICAL ENCODER

FIELD OF THE INVENTION

Various embodiments of the inventions described herein relate to the field of optical encoders, and components, devices, systems and methods associated therewith.

BACKGROUND

Optical encoders are typically employed as motion detectors in applications such as closed-loop feedback control in motor control systems. By way of example, many optical encoders are configured to translate rotary motion or linear motion into a two-channel digital output for position encoding.

Many optical encoders employ an LED as a light source. In transmissive encoders, the light is collimated in to a parallel beam by means of a lens located over the LED. Opposite the emitter is a light detector that typically consists of photodiode arrays and a signal processor. When a code scale such as a code wheel or code strip moves between the light emitter and light detector, the light beam is interrupted by a pattern of bars and spaces disposed on the code scale. Similarly, in reflective or imaging encoders, the lens over an LED focuses light onto the code scale. Light is either reflected or not reflected back to the lens disposed over the photo-detector. As the code scale moves, an alternating pattern of light and dark patterns corresponding to the bars and spaces falls upon the photodiodes. The photodiodes detect these patterns and corresponding outputs are processed by the signal processor to produce digital waveforms. Such encoder outputs are used to provide information about position, velocity and acceleration of a motor, by way of example.

A typical reflective optical encoder comprises a light detector, a light emitter and a code wheel or code scale. The detector generates an output by processing photo currents provided by photodiode arrays included in the light detector. In general, reflective optical encoders include four photodiode channels, namely A, A\, B and B\, which are arranged along a single track in a 2-channel optical encoder. The photodiodes are arranged so that gaps separating adjacent photodiodes are sufficiently large to prevent or inhibit crosstalk from being generated between such adjoining photodiodes. In the prior art, as the resolution of an optical encoder increased, the spacing between adjoining photodiodes decreased, which in turn led to increased crosstalk between channels.

FIG. 1 shows a conventional prior art single track optical encoder 10 with photodiode array 20 comprising detectors A, A\, B and B\ in a two-channel encoder with associated code strip 30. Signals generated by detectors A and A\ (channel A) and B and B\ (channel B) are also shown in FIG. 1, where the Channel B output signal lags the Channel A output signal by 90 degrees. (The relatively simple circuitry employed to generate output signals for channels A and B is not shown in FIG. 1, but is well known to those skilled in the art and therefore need not be discussed further herein.) The separation between adjoining photodiodes in array 20 and the width of each photodiode is selected according to the resolution that is required of the optical encoder. When the resolution of optical encoder 10 is increased, either the spacing w between adjoining photodiodes is reduced, or the width of each photodiode along common axis 15 is reduced, or both, resulting in photodiode spacing z being decreased, where z is the spacing between the leading or trailing edges of adjoining photodiodes. Continuing to refer to FIG. 1, note that within a distance X"/2 of photodiode array 20 two photodiodes are to be found.

FIG. 2 shows another conventional prior art single track optical encoder 10 with photodiode array 20 comprising detectors A, A\, B and B\ in a two-channel encoder with associated code strip 30. Optical encoder 10 of FIG. 2 has twice the spatial resolution of encoder 10 of FIG. 1: note that code scale 30 shown in FIG. 2 has alternating bands of substantially reflective portions 31 and substantially non-reflective portions 33 having a combined length of X""/2, which is half that of FIG. 1 (X"). As illustrated in FIG. 2, the minimum separation between adjoining photodiodes or photodetectors A, B, A\ and B\ is also w. Crosstalk between adjoining photodiodes is generated between the 2 channels of encoder 10 if the separation between adjoining photodiodes is less than w. When the resolution of photodiodes A, B, A\ and B\ is increased (i.e., the widths of such photodiodes are decreased), spacing Z is reduced. Hence, either the widths of the individual photodiodes within spacing z or the separation between the photodiodes w needs to be reduced. Spacing z and inter-photodiode separation w limited by the process technology which has been selected (e.g., CMOS, BiCMOS, etc.).

FIG. 3 shows another conventional prior art single track optical encoder 10 with photodiode array 20 comprising detectors A, A\, B and B\ in a two-channel encoder with associated code strip 30. Optical encoder 10 of FIG. 3 has four times the spatial resolution of encoder 10 of FIG. 1: note that code scale 30 shown in FIG. 2 has alternating bands of substantially reflective portions 31 and substantially non-reflective portions 33 having a combined length of X""/4, which is one-quarter that of FIG. 1 (X"). As illustrated in FIG. 3, the minimum separation between adjoining photodiodes or photodetectors A, B, A\ and B\ is less than w, and as a result crosstalk between adjoining photodiodes will be generated. Photodiode width y shown in FIG. 3 is the minimum width of a photodiode for a selected manufacturing process (e.g., CMOS, BiCMOS, etc.). Crosstalk thus occurs between the A and B channels, as the separation w between adjoining photodiodes violated the photodiode separation rule. Moreover, the small width y of each photodiode results in a small amount of electrical current being generated by each photodiode, as the current generated by each photodiode is proportional to the amount of each photodiode's surface area. Hence, the performance of the encoder is affected because cross-talk is generated while the signal-to-noise ratio is low. As a result, and to achieve sufficiently high resolution using a conventional optical encoder, additional circuitry (such as interpolation, filtering or amplification circuitry) may be required to provide adequate performance. Such additional circuitry, of course, increases the cost and size of the encoder.

Note that in each of optical encoders 10 illustrated in FIGS. 1, 2 and 3 the spacing z between the leading or trailing edges of adjoining photodiodes corresponds to one-quarter the combined width of a single pair of adjoining light and dark strips on code scale 30. As a result, two photodiodes are contained within a distance defining the length of each such strip along common axis 15. Note further that in each of optical encoders 10 illustrated in FIGS. 1, 2 and 3 all photodiodes disposed along single track or common axis 15 are arranged in the order or sequence A, B, A\, and B\.

The market demands ever smaller and higher resolution optical reflective encoders. What is needed is a smaller, higher resolution optical reflective encoder that can be provided without the use of complicated, expensive, signal processing output circuitry.

Various patents containing subject matter relating directly or indirectly to the field of the present invention include, but are not limited to, the following:

U.S. Pat. No. 5,148,020 to Machida, Sep. 15, 1992;
U.S. Pat. No. 6,727,493 to Franklin et al., Apr. 27, 2004;
U.S. Pat. No. 7,145,128 to Tanaka, Dec. 5, 2006;
U.S. Pat. No. 7,276,687 to Okada et al., Oct. 2, 2007, and
U.S. Pat. No. 7,449,675 to Chong et al., Nov. 11, 2008.

The dates of the foregoing publications may correspond to any one of priority dates, filing dates, publication dates and issue dates. Listing of the above patents and patent applications in this background section is not, and shall not be construed as, an admission by the applicants or their counsel that one or more publications from the above list constitutes prior art in respect of the applicant's various inventions. All printed publications and patents referenced herein are hereby incorporated by referenced herein, each in its respective entirety.

Upon having read and understood the Summary, Detailed Description and Claims set forth below, those skilled in the art will appreciate that at least some of the systems, devices, components and methods disclosed in the printed publications listed herein may be modified advantageously in accordance with the teachings of the various embodiments of the present invention.

SUMMARY

In some embodiments, there is provided a high resolution single track reflective optical encoder comprising a light emitter configured to emit light therefrom, a plurality of photodetectors or photodiodes having leading and trailing edges arranged along a single track and a common axis to form a single track light detector, the single track light detector having disposed along the common axis pairs of A and A\ data channel light detectors and B and B\ data channel light detectors, the A and B light detectors and the A\ and B\ light detectors, respectively, being arranged to generate output signals that are 90 degrees out of phase with respect to one another, and a code scale comprising alternating optically substantially reflective and substantially non-reflective data strips, any pair of adjoining reflective and non-reflective data strips disposed on the code scale having a combined width of X, the code scale being configured to travel along the common axis and being located and configured operably in respect of the single track light detector such that at least a portion of the light emitted from the light emitter is reflected from the code scale towards the data channel light detectors, wherein a spacing between at least some adjoining photodetectors or photodiodes arranged along the single track and the common axis is greater than or equal to X/2, the spacing being measured between either the leading edges or the trailing edges of such adjoining photodetectors or photodiodes, the spacing being sufficiently large to prevent or inhibit cross-talk between adjoining photodiodes, the resulting optical encoder having a spatial resolution of X/2.

In other embodiments, there is provided a method of making a high resolution single track reflective optical encoder comprising providing a light emitter configured to emit light therefrom, providing a plurality of photodetectors or photodiodes having leading and trailing edges arranged along a single track and a common axis to form a single track light detector, the single track light detector having disposed along the common axis a plurality of pairs of A and A\ data channel light detectors, and B and B\ data channel light detectors, the A and B light detectors, and the A\ and B\ light detectors, respectively, being arranged to generate output signals that are 90 degrees out of phase with respect to one another, providing a code scale comprising alternating optically substantially reflective and substantially non-reflective data strips, wherein any pair of adjoining reflective and non-reflective data strips disposed on the code scale has a combined width equal to X, the code scale being configured to travel along the common axis and being located and configured operably in respect of the single track light detector such that at least a portion of the light emitted from the light emitter is reflected from the code scale towards the data channel light detectors, and arranging a spacing between at least some adjoining photodetectors or photodiodes disposed along the single track and the common axis such that the spacing is greater than or equal to X/2, the spacing being measured between either the leading edges or the trailing edges of such adjoining photodetectors or photodiodes, the spacing being sufficiently large to prevent or inhibit cross-talk between adjoining photodiodes, the resulting optical encoder having a spatial resolution of X/2.

In still other embodiments, there is provided a method of encoding light signals generated by an optical encoder having a single track and a common axis comprising emitting light from a light emitter towards a code scale, reflecting at least a portion of the light emitted by the light emitter from the code scale, the code scale comprising alternating optically substantially reflective and substantially non-reflective data strips, wherein any pair of adjoining reflective and non-reflective data strips disposed on the code scale has a combined width equal to X, the code scale being configured to travel along the common axis, detecting at least a portion of the light reflected from the code scale with a plurality of photodetectors or photodiodes having leading and trailing edges arranged along the single track and the common axis to form a single track light detector, the single track light detector having disposed along the common axis a plurality of pairs of A and A\data channel light detectors, and B and B\ data channel light detectors, the A and B light detectors, and the A\ and B\ light detectors, respectively, being arranged to generate output signals that are 90 degrees out of phase with respect to one another, and arranging a spacing between at least some adjoining photodetectors or photodiodes disposed along the single track and the common axis such that the spacing is greater than or equal to X/2, the spacing being measured between either the leading edges or the trailing edges of such adjoining photodetectors or photodiodes, the spacing being sufficiently large to prevent or inhibit cross-talk between adjoining photodiodes, the resulting optical encoder having a spatial resolution of X/2.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME PREFERRED EMBODIMENTS

In various embodiments of the invention, single track reflective optical encoder systems, devices and methods, are provided.

As employed herein, the term "single track encoder" means an optical encoder having a single code scale having data or code patterns or bars formed or presented thereon or therein, as well as index patterns or bars formed or presented thereon or therein, where the data and index patterns travel together along a common single axis in a single track disposed over a corresponding single track comprising data channel and index channel light detectors.

In the various embodiments of the inventions disclosed herein, unique arrangements and sequences of photodiodes 20 are disposed along a single track or common axis 15, where photodiodes 20 are not limited to being arranged in the order A, B\, A\, B\ as in the prior art. As is discussed in further detail below, the unique arrangements of photodiodes 20 presented herein are useful in providing high resolution optical encoders.

Figure 4:
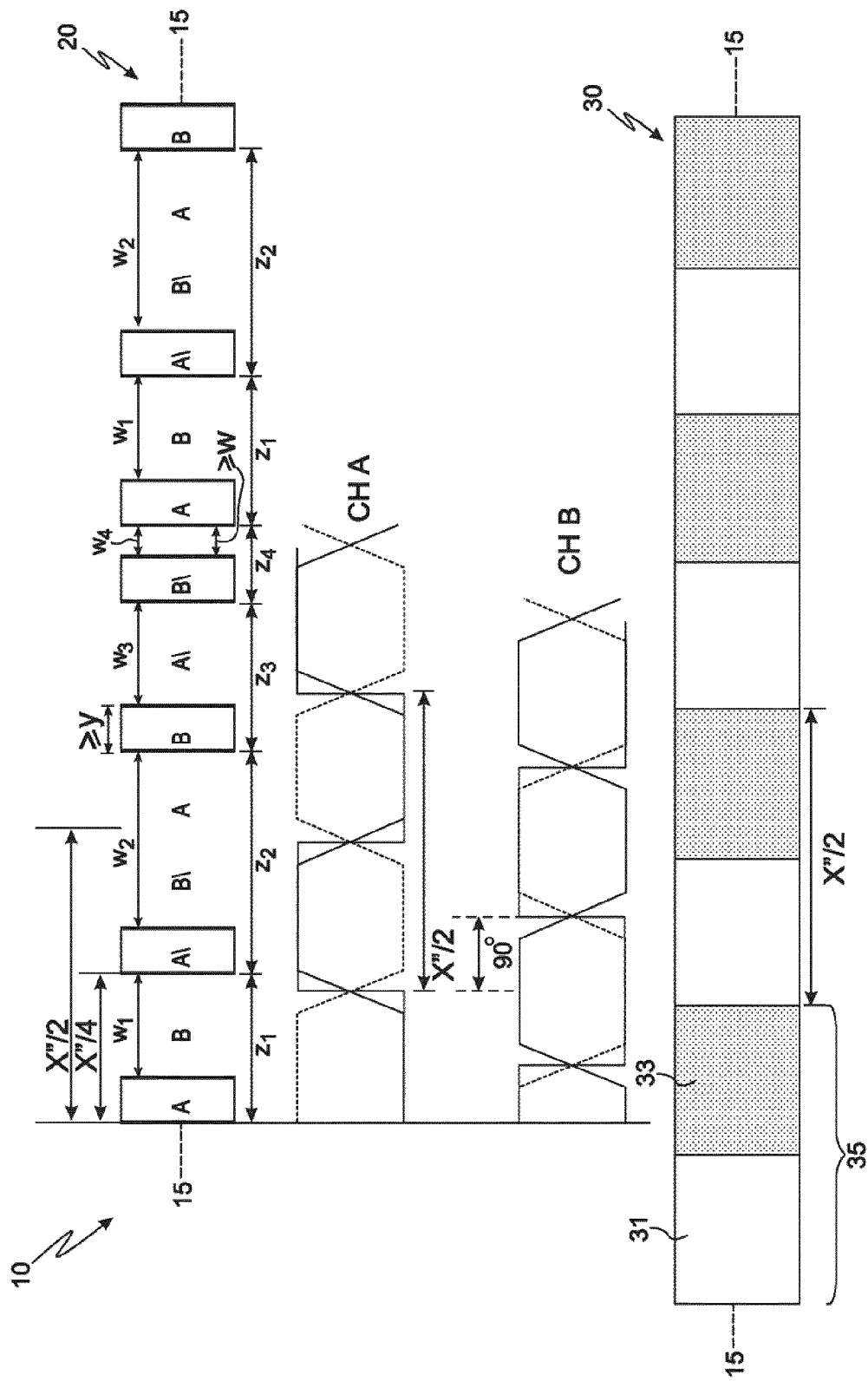
FIG. 4 shows one embodiment of an optical encoder 10 having spatial resolution X"/4.

Referring now to FIG. 4, there is shown one embodiment of optical encoder 10 having spatial resolution X″/4 and comprising photodiodes or photodetectors A, A\, B and B\ in a two-channel encoder with associated code strip 30. Signals generated by detectors A and A\ (channel A) and B and B\ (channel B) are also shown in FIG. 4, where the Channel B output signal lags the Channel A output signal by 90 degrees. (The relatively simple circuitry employed to generate output signals for channels A and B is not shown in FIG. 4, but is well known to those skilled in the art and therefore need not be discussed further herein.) The separation between adjoining photodiodes in array 20 and the width of each photodiode has been selected according to the desired spatial resolution of the encoder (which in this case is X″/4) and the output signal amplitude that is to be provided by each individual photodiode.

As further illustrated in FIG. 4, "missing" photodiodes B, B\, A, A\, B, B\ and A are shown in their corresponding "missing" locations along common axis 15, while the photodiodes which remain in photodiode array 20 are illustrated with their corresponding rectangles and are labeled A, A\, B, B\, A, A\ and B. As illustrated, each of photodiodes A, A\, B, and B\ is characterized by a leading edge to leading edge inter-photodiode spacing or distance of $z_1$, $z_2$, $z_3$ and $z_4$, respectively, with respect to its next neighbouring photodiode in the rightward direction. As further shown in FIG. 4, only one photodiode is located within each of distances $z_1$, $z_2$ and $z_3$, or in other words within the distance X″/4, which defines the resolution of optical encoder 10 shown in FIG. 4. The sequence of photodiodes A, A\, B, and B\ repeats fully or partially after distance $z_4$ according to the particular spatial resolution and signal strength requirements at hand.

Figure 1:
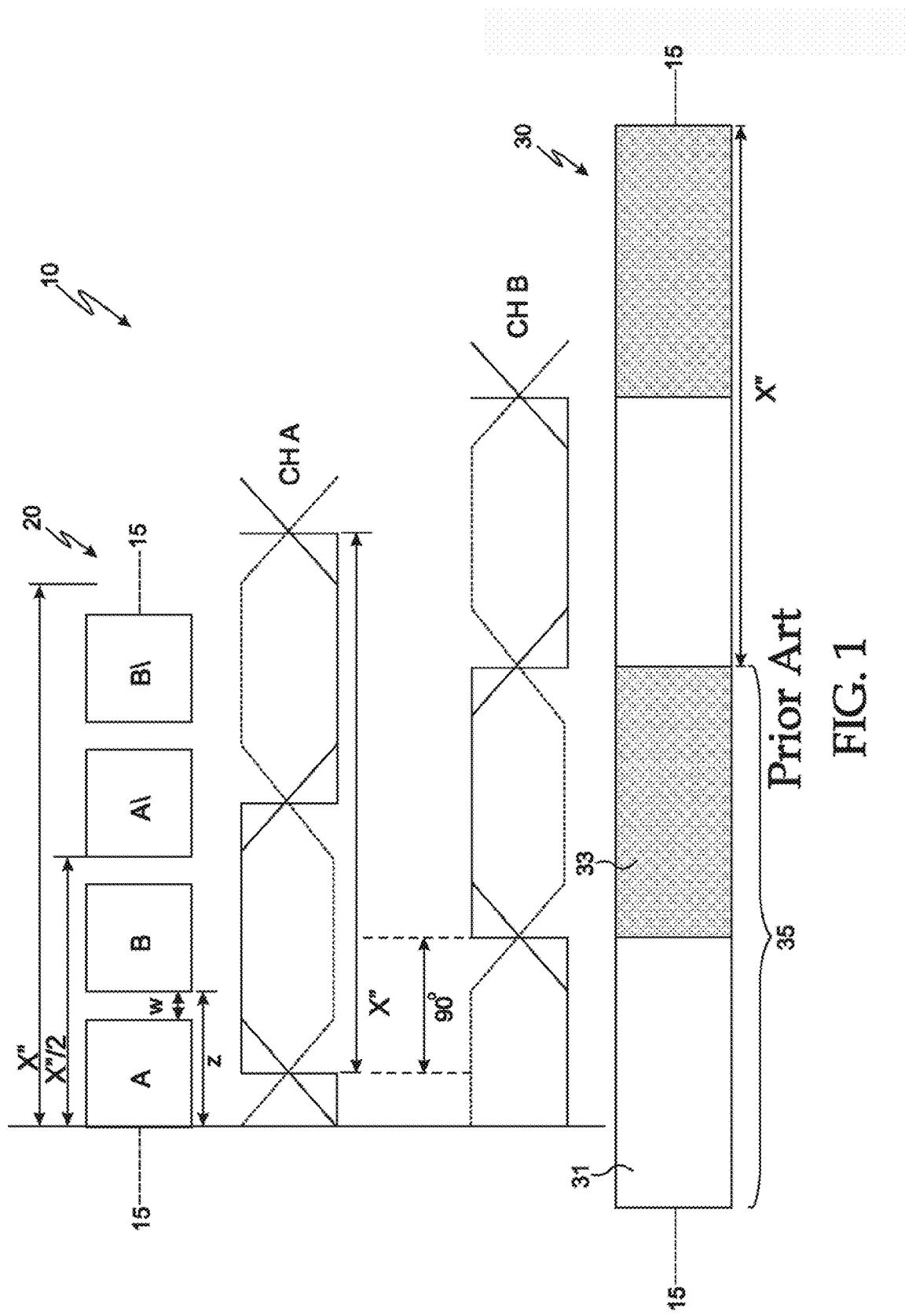
FIG. 1 shows a prior art optical encoder 10 having a spatial, resolution X"/2.
Figure 2:
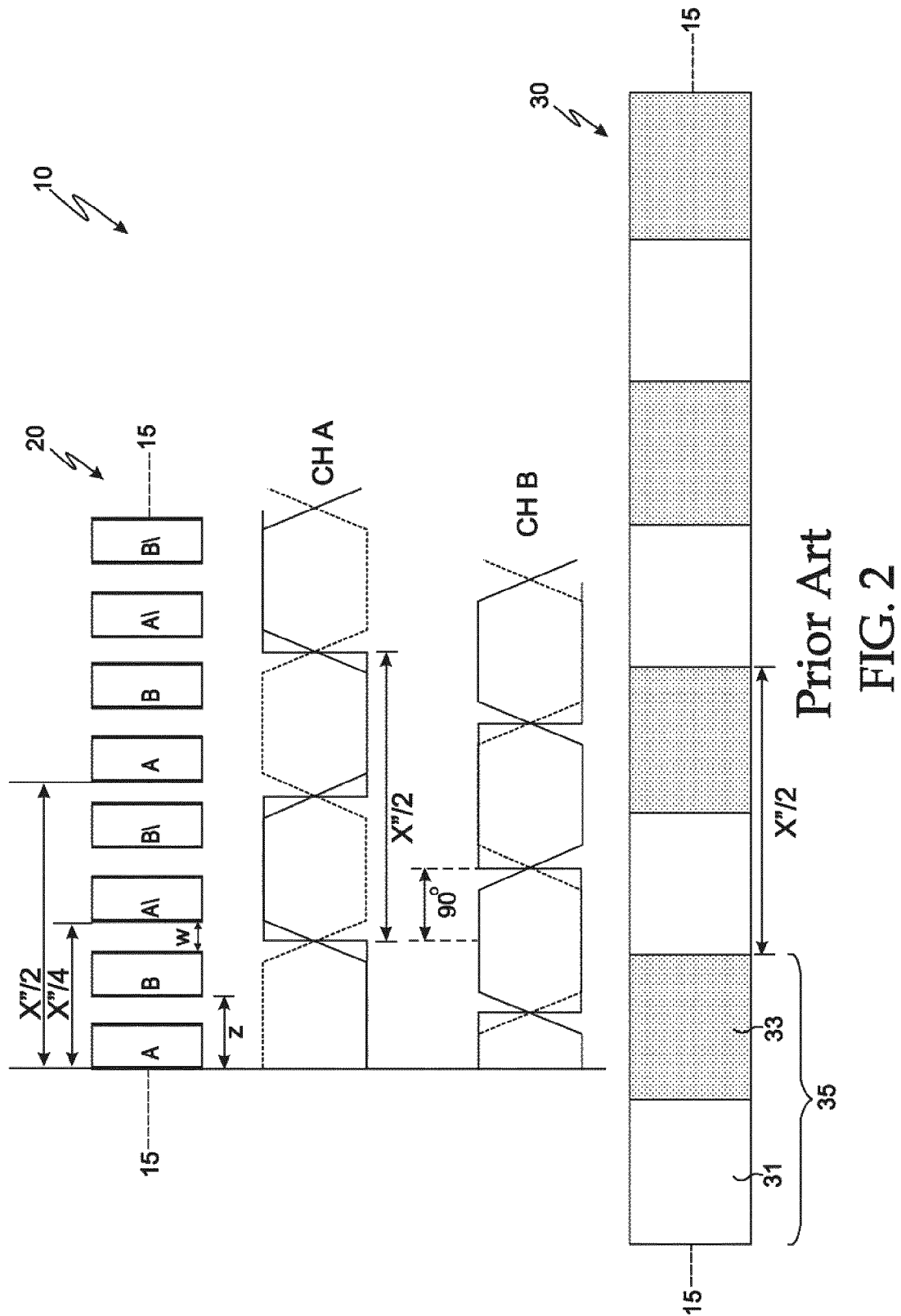
FIG. 2 shows a prior art optical encoder 10 having a spatial resolution X"/4.

Comparison of the output signals provided by channels A and B of FIG. 4 to those of FIG. 2 will show that the output signals provided by the two different encoders 10 are identical. Further comparison between the two encoders 10 will also show that the spacings or distances w between adjoining photodiodes 20 of encoder 10 in FIG. 4 are substantially greater than those of encoder 10 in FIG. 2. Consequently, in the embodiment of optical encoder 10 shown in FIG. 4, cross-talk is minimized or eliminated, and the individual widths of the photodiodes may be made greater to boost the output signals provided thereby without generating cross-talk in respect of encoder 10 shown in FIG. 2. Moreover, and as discussed in greater detail below, the unique arrangement of photodiodes 20 along common axis 15 can also be employed to increase spatial resolution beyond X″/2 without generating undesired cross-talk and while maintaining sufficient photodiode output signal strength owing to sufficient photodiode surface area being preserved despite reducing spacings or distances z.

The unique arrangement of photodiodes 20 shown in FIG. 4 results in an optical encoder 10 having increased spatial resolution and preserved, constant or even increased photodiode output signal strengths. The spacings or distances between adjacent photodiodes still meet the minimum photodiode separation rule of equalling or exceeding w, while the widths of individual photodiodes still meet the minimum photodiode width rule necessary to produce sufficiently high amplitude output signals of equalling or exceeding y. Moreover, should a slight radial misalignment occur in respect of code strip 30 and photodiode array 20, performance of optical encoder 10 is unlikely to be affected as the separation between adjoining photodiodes is greater than or equal to the minimum spacing w, which is generally limited by the process technology being employed to fabricate photodiode 20 (e.g., CMOS or BiCMOS processes).

Figure 5:
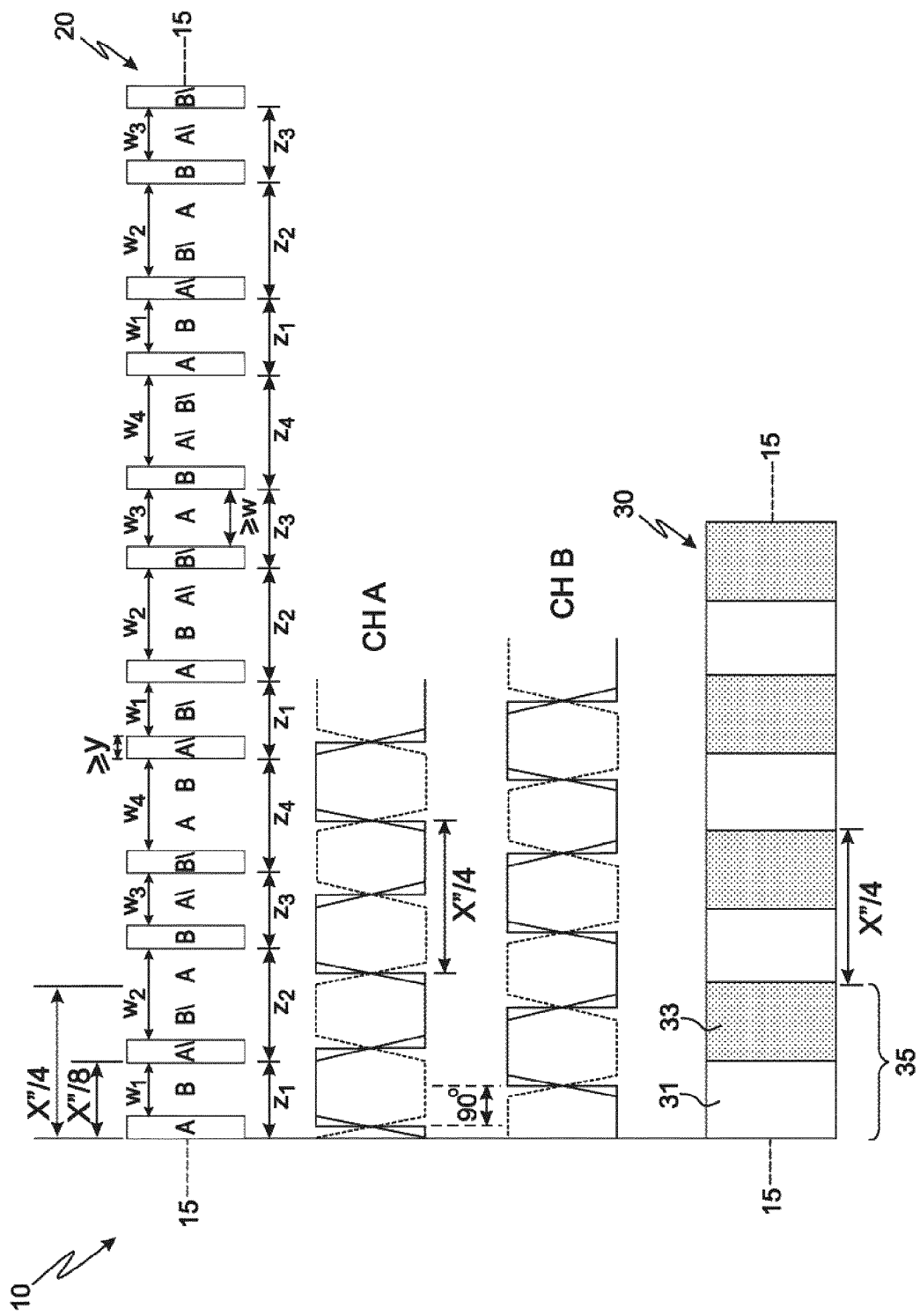
FIG. 5 shows one embodiment of an optical encoder 10 having spatial resolution X"/8.

FIG. 5 shows an embodiment of optical encoder 10 where spatial resolution is increased to X″/8 using the same sequence of photodiodes A, A\, B and B\ shown in FIG. 4 with "missing" photodiodes located therebetween. As illustrated, each of photodiodes A, A\, B, and B\ is characterized by a leading edge to leading edge inter-photodiode spacing or distance of $z_1$, $z_2$, $z_3$ and $z_4$, respectively, with respect to its next neighbouring photodiode in the rightward direction, where such distances are half those shown in FIG. 4. As further shown in FIG. 5, and as in the embodiment illustrated in FIG. 4, only one photodiode is located within each of distances $z_1$, $z_2$ and $z_3$, or in other words within the distance X″/8, which defines the resolution of optical encoder 10 shown in FIG. 5. The sequence of photodiodes A, A\, B, and B\ repeats fully or partially after distance $z_4$ according to the particular spatial resolution and signal strength requirements at hand.

Figure 3:
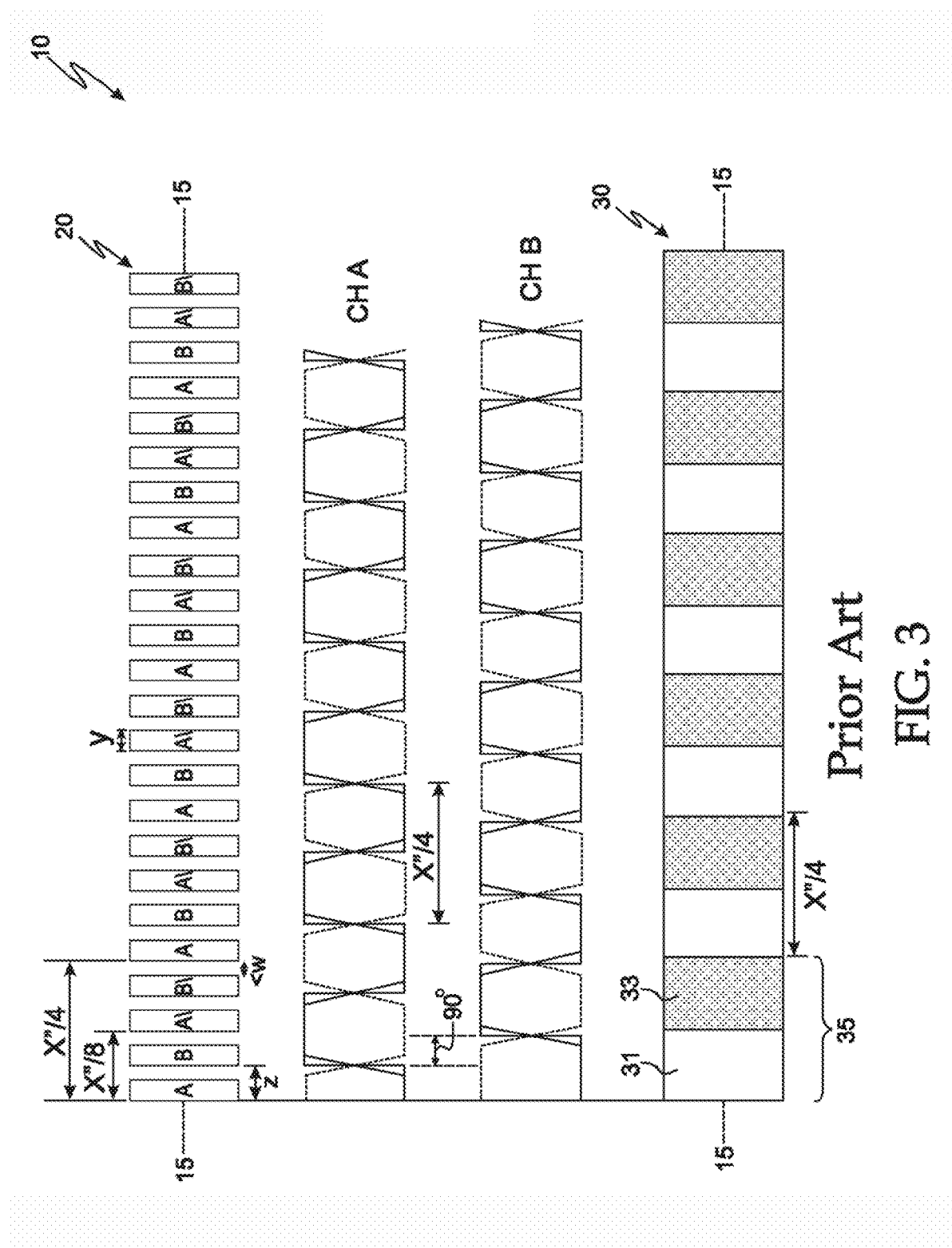
FIG. 3 shows a prior art optical encoder 10 having a spatial resolution X"/8.

Comparison of the output signals provided by channels A and B of FIG. 5 to those of FIG. 3 will show that the output signals provided by the two different encoders 10 are identical (except for the cross-talk and reduced amplitude signals provided by encoder 10 shown in FIG. 3). Further comparison between the two encoders 10 will also show that the spacings or distances w between adjoining photodiodes 20 of encoder 10 in FIG. 5 are substantially greater than those of encoder 10 in FIG. 3. Consequently, in the embodiment of optical encoder 10 shown in FIG. 5, cross-talk is minimized or eliminated, and the individual widths of the photodiodes may be made greater to boost the output signals provided thereby without generating cross-talk in respect of encoder 10 shown in FIG. 3. Moreover, the unique arrangement of photodiodes 20 along common axis 15 can also be employed to increase spatial resolution without generating undesired cross-talk and while maintaining sufficient photodiode output signal strength owing to sufficient photodiode surface area being preserved despite reducing spacings or distances z.

As further shown in FIG. 5, the spacings or distances between adjacent photodiodes still meet the minimum photodiode separation rule of equalling or exceeding w, while the widths of individual photodiodes still meet the minimum photodiode width rule necessary to produce sufficiently high amplitude output signals of equalling or exceeding y. Moreover, and as in the embodiment illustrated in FIG. 4, should a slight radial misalignment occur in respect of code strip 30 and photodiode array 20, performance of optical encoder 10 is unlikely to be affected as the separation between adjoining photodiodes is greater than or equal to the minimum spacing w.

Figure 6:
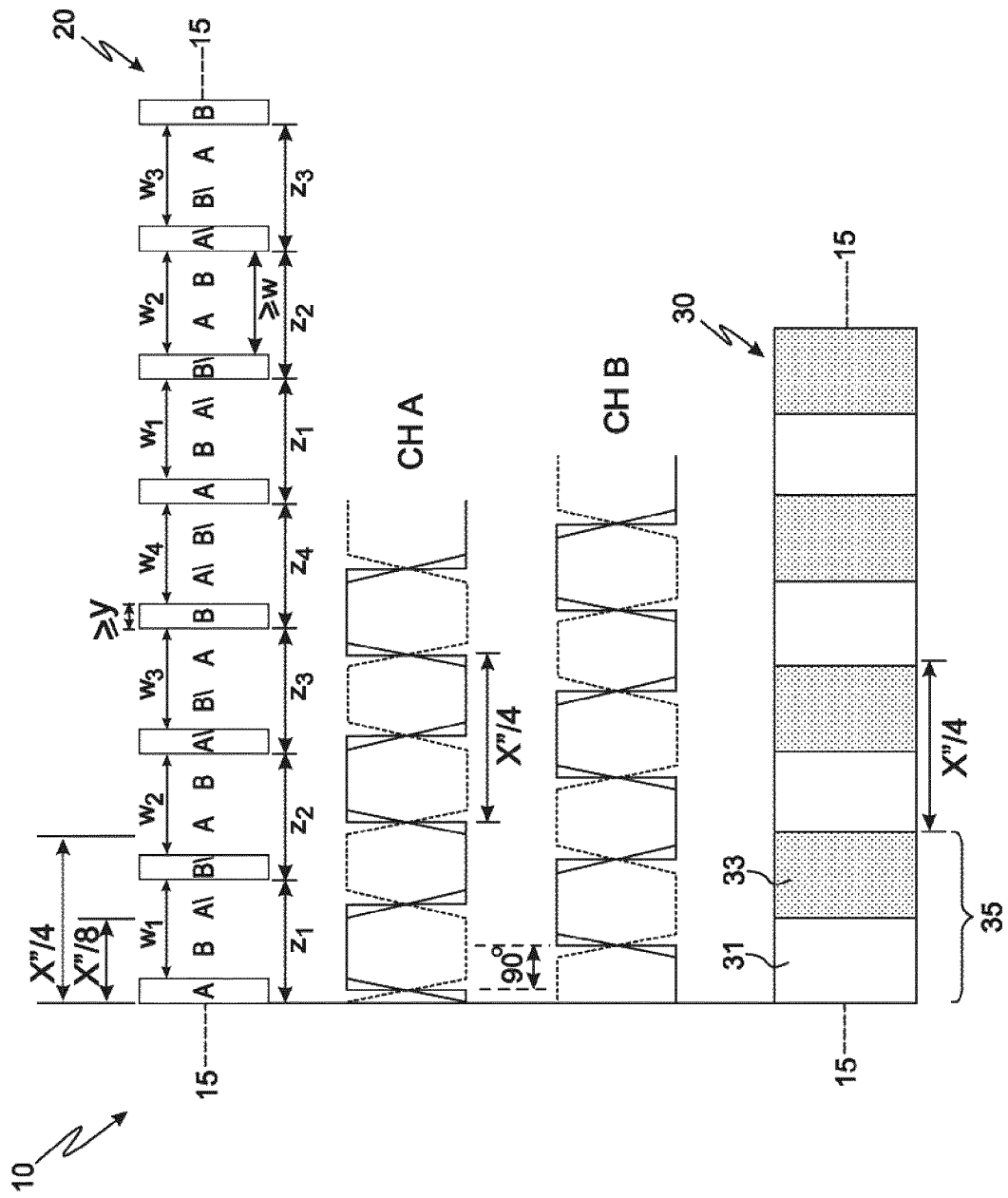
FIG. 6 shows another embodiment of an optical encoder 10 having spatial resolution X″/8.

FIG. 6 shows another unique way to arrange the individual photodiodes of photodiode array 20 in a sequence A, B\, A\, and B, where optical encoder 10 has a spatial resolution X"/8. Signals generated by detectors A and A\(channel A) and B and B\(channel B) are also shown in FIG. 6, where the Channel B output signal lags the Channel A output signal by 90 degrees. (The relatively simple circuitry employed to generate output signals for channels A and B is not shown in FIG. 6, but is well known to those skilled in the art and therefore need not be discussed further herein.) The separation between adjoining photodiodes in array 20 and the width of each photodiode has been selected according to the desired spatial resolution of the encoder (which in this case is X"/8) and the output signal amplitude that is to be provided by each individual photodiode.

As further illustrated in FIG. 6, "missing" photodiodes B, A\, A, B, B\, A, A\, B\, B, A\, A, B, B\ and A are shown in their corresponding "missing" locations along common axis 15, while the photodiodes which remain in photodiode array 20 are illustrated with their corresponding rectangles and are labeled A, B\, A\, and B. As illustrated, each of photodiodes A, B\, A\, and B is characterized by a leading edge to leading edge inter-photodiode spacing or distance of $z_1$, $z_2$, $z_3$ and $z_4$, respectively, with respect to its next neighbouring photodiode in the rightward direction. As further shown in FIG. 6, only one photodiode is located within each of distances $z_1$, $z_2$, $z_3$ and $Z_4$ or in other words within the distance X"/8, which defines the resolution of optical encoder 10 shown in FIG. 6. The sequence of photodiodes A, B\, A\, and B repeats fully or partially after distance $z_4$ according to the particular spatial resolution and signal strength requirements that are at hand.

Comparison of the output signals provided by channels A and B of FIG. 6 to those of FIG. 3 will show that the output signals provided by the two different encoders 10 are identical. Further comparison between the two encoders 10 will also show that the spacings or distances w between adjoining photodiodes 20 of encoder 10 in FIG. 6 are substantially greater than those of encoder 10 in FIG. 3. Consequently, in the embodiment of optical encoder 10 shown in FIG. 6, cross-talk is minimized or eliminated, and the individual widths of the photodiodes may be made greater to boost the output signals provided thereby without generating cross-talk in respect of encoder 10 shown in FIG. 3.

The unique arrangement of photodiodes 20 shown in FIG. 6 results in an optical encoder 10 having increased spatial resolution and preserved, constant or even increased photodiode output signal strengths. The spacings or distances between adjacent photodiodes still meet the minimum photodiode separation rule of equalling or exceeding w, while the widths of individual photodiodes still meet the minimum photodiode width rule necessary to produce sufficiently high amplitude output signals of equalling or exceeding y. Moreover, should a slight radial misalignment occur in respect of code strip 30 and photodiode array 20, performance of optical encoder 10 is unlikely to be affected as the separation between adjoining photodiodes is greater than or equal to the minimum spacing w, which is generally limited by the process technology being employed to fabricate photodiode 20 (e.g., CMOS or BiCMOS processes).

Figure 7:
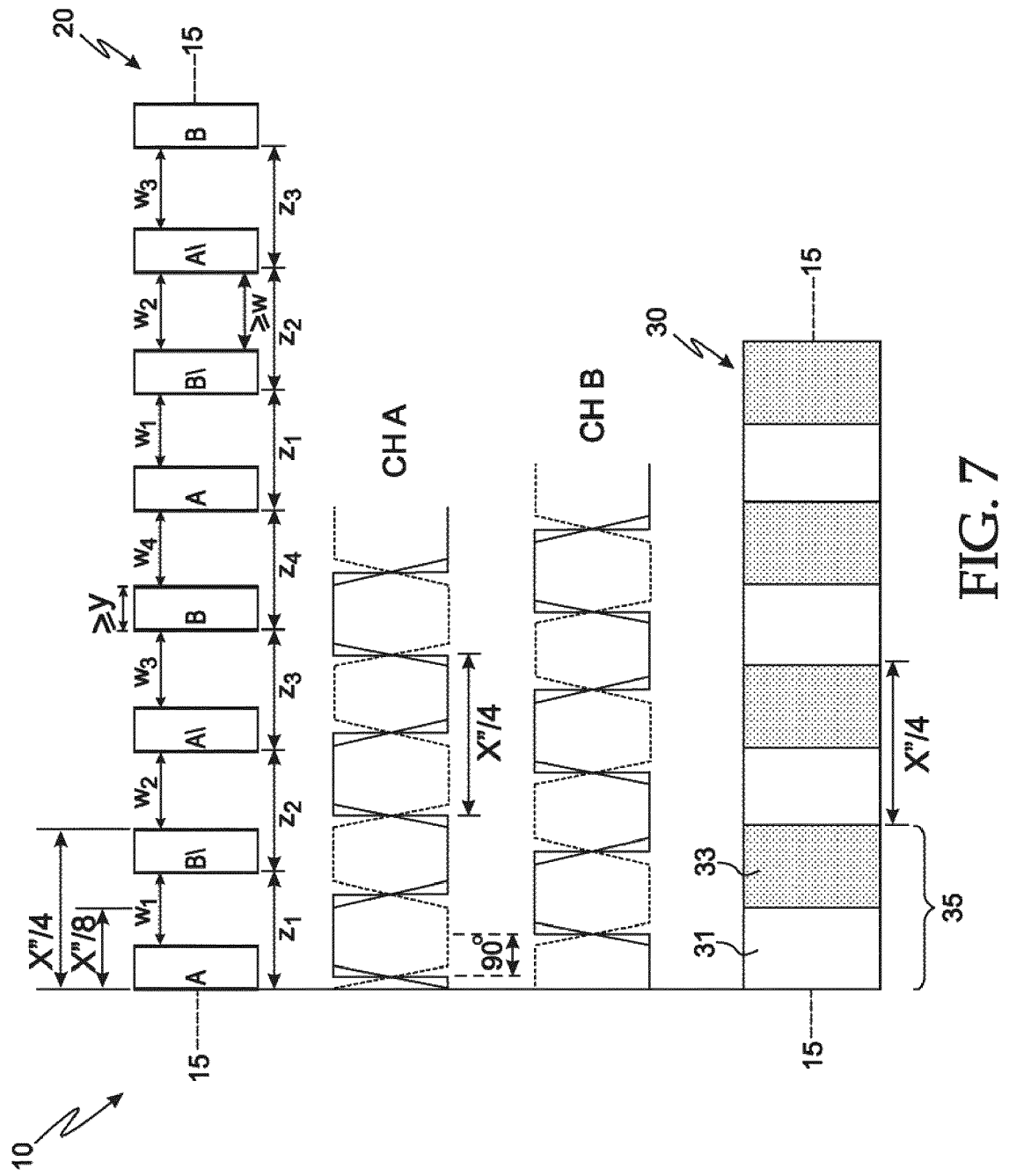
FIG. 7 shows yet another embodiment of an optical encoder 10 having spatial resolution X″/8.

FIG. 7 shows still another unique way to arrange the individual photodiodes of photodiode array 20 in a sequence A, B\, A\, and B, where optical encoder 10 has a spatial resolution X"/8, and where the individual photodiodes of photodiode array 20 have a much greater width than those shown in FIG. 3, which results in higher amplitude signals being outputted by the individual photodiodes of photodiode array 20. Such greater photodiode width is permitted by increased spacings or distances $z_1$, $Z_2$, $Z_3$ and $z_4$ in photodiode array 20 relative to those shown in FIG. 3. Signals generated by detectors A and A\ (channel A) and B and B\ (channel B) are also shown in FIG. 7, where the Channel B output signal lags the Channel A output signal by 90 degrees. (As mentioned above, the relatively simple circuitry employed to generate output signals for channels A and B is not shown in FIG. 7, but is well known to those skilled in the art and therefore need not be discussed further herein.) The separation between adjoining photodiodes in array 20 and the width of each photodiode has been selected according to the resolution and the output signal amplitude provided by each individual photodiode required of the optical encoder, which in this case is X"/8. Note further that individual photodiodes in FIG. 7 are of greater width y than those shown in FIG. 6, and that the spacings $w_1$ through $w_4$ between individual photodiodes in FIG. 7 are less than those shown in FIG. 6.

As further illustrated in FIG. 7, the photodiodes which remain in photodiode array 20 are illustrated with their corresponding rectangles and are labeled A, B\, A\, and B. As illustrated, each of photodiodes A, B\, A\, and B is characterized by a leading edge to leading edge inter-photodiode spacing or distance of $z_1$, $Z_2$, $Z_3$ and $z_4$, respectively, with respect to its next neighbouring photodiode in the rightward direction. As further shown in FIG. 7, only one photodiode is located within each of distances $z_1$, $z_2$, $Z_3$ and $Z_4$ or in other words within the distance X"/8, which defines the resolution of optical encoder 10 shown in FIG. 7. The sequence of photodiodes A, A\, B, and B\ repeats fully or partially after distance $z_4$ according to the particular spatial resolution and signal strength requirements that are at hand. Comparison of the output signals provided by channels A and B of FIG. 7 to those of FIG. 3 will show that the output signals provided by the two different encoders 10 are identical. Further comparison between the two encoders 10 will also show that the spacings or distances w between adjoining photodiodes 20 of encoder 10 in FIG. 7 are substantially greater than those of encoder 10 in FIG. 3. Consequently, in the embodiment of optical encoder 10 shown in FIG. 7, cross-talk is minimized or eliminated, and the individual widths of the photodiodes may be made greater to boost the output signals provided thereby without generating cross-talk in respect of encoder 10 shown in FIG. 3.

The unique arrangement of photodiodes 20 shown in FIG. 7 results in an optical encoder 10 having increased spatial resolution and preserved, constant or even increased photodiode output signal strengths. The spacings or distances between adjacent photodiodes still meet the minimum photodiode separation rule of equaling or exceeding w, while the widths of individual photodiodes still meet the minimum photodiode width rule necessary to produce sufficiently high amplitude output signals of equalling or exceeding y. Moreover, should a slight radial misalignment occur in respect of code strip 30 and photodiode array 20, performance of optical encoder 10 is unlikely to be affected as the separation between adjoining photodiodes is greater than or equal to the minimum spacing w, which is generally limited by the process technology being employed to fabricate photodiode 20 (e.g., CMOS or BiCMOS processes).

Figure 8:
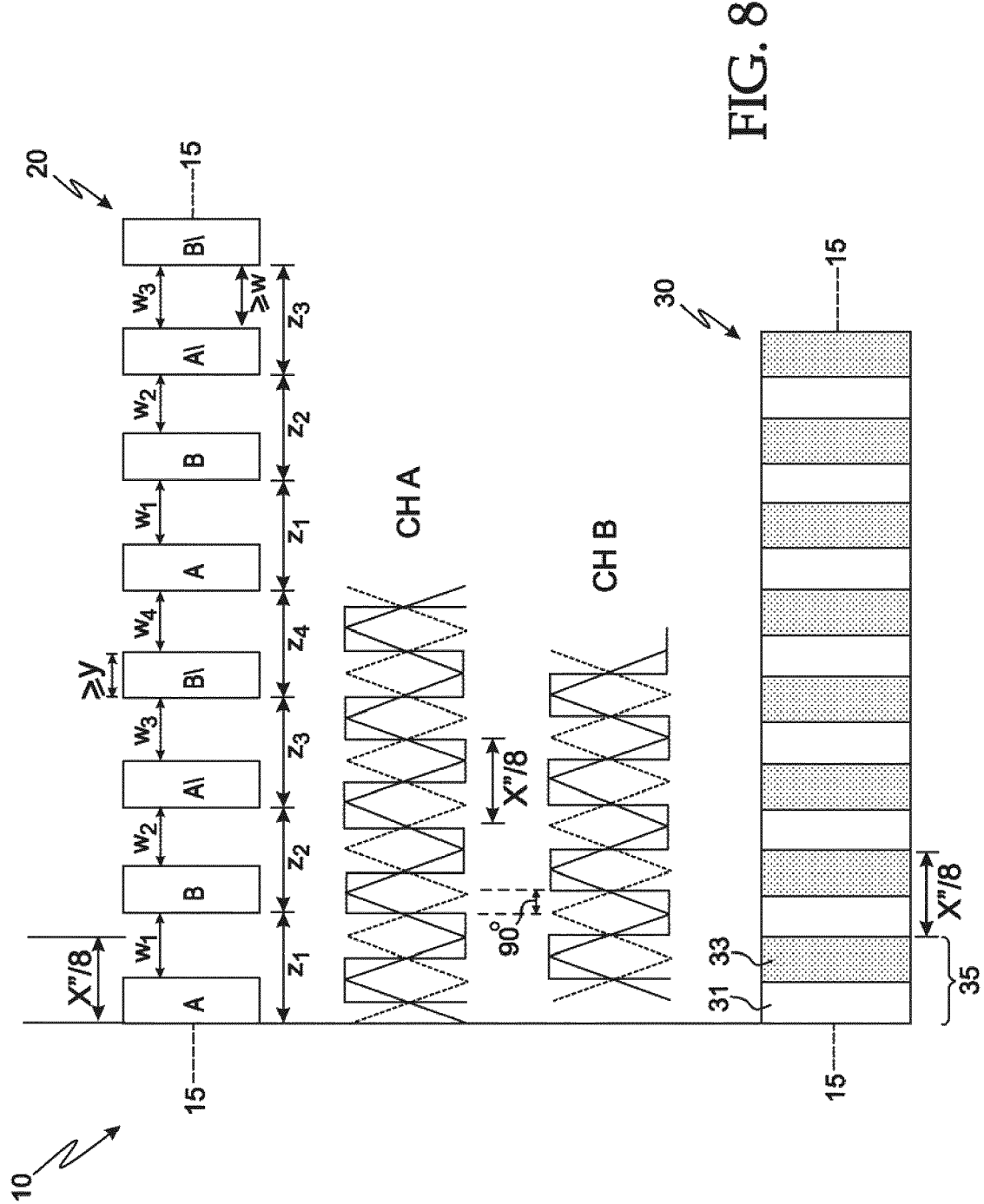
FIG. 8 shows still another embodiment of an optical encoder 10 having spatial resolution X″/8.

FIG. 8 shows yet another unique way to arrange the individual photodiodes of photodiode array 20 in a sequence A, B, A\, and B\, where optical encoder 10 has a spatial resolution X"/8, and where the individual photodiodes of photodiode array 20 have a much greater width than those shown in FIG. 3, which results in higher amplitude signals being outputted by the individual photodiodes of photodiode array 20. Such greater photodiode width is permitted by increased spacings or distances $z_1$, $z_2$, $z_3$ and $z_4$ in photodiode array 20 relative to those shown in FIG. 3. Signals generated by detectors A and A\(channel A) and B and B\(channel B) are also shown in FIG. 8, where the Channel B output signal lags the Channel A output signal by 90 degrees. (As mentioned above, the relatively simple circuitry employed to generate output signals for channels A and B is not shown in FIG. 8, but is well known to those skilled in the art and therefore need not be discussed further herein.) The separation between adjoining photodiodes in array 20 and the width of each photodiode has been selected according to the resolution and the output signal amplitude provided by each individual photodiode required of the optical encoder, which in this case is X"/8.

As further illustrated in FIG. 8, the photodiodes which remain in photodiode array 20 are illustrated with their corresponding rectangles and are labeled A, B, A\, and B\. As illustrated, each of photodiodes A, B, A\, and B\ is characterized by a leading edge to leading edge inter-photodiode spacing or distance of $z_1$, $z_2$, $Z_3$ and $Z_4$, respectively, with respect to its next neighbouring photodiode in the rightward direction. As further shown in FIG. 8, only one photodiode is located within each of distances $z_1$, $z_2$, $z_3$ and $z_4$, or in other words within the distance X"/8, which defines the resolution of optical encoder 10 shown in FIG. 8. The sequence of photodiodes A, A\, B, and B\ repeats fully or partially after distance $z_4$ according to the particular spatial resolution and signal strength requirements that are at hand. Comparison of the output signals provided by channels A and B of FIG. 8 to those of FIG. 3 will show that the output signals provided by the two different encoders 10 are identical. Further comparison between the two encoders 10 will also show that the spacings or distances w between adjoining photodiodes 20 of encoder 10 in FIG. 8 are substantially greater than those of encoder 10 in FIG. 3. Consequently, in the embodiment of optical encoder 10 shown in FIG. 8, cross-talk is minimized or eliminated, and the individual widths of the photodiodes may be made greater to boost the output signals provided thereby without generating cross-talk in respect of encoder 10 shown in FIG. 3. The unique arrangement of photodiodes 20 shown in FIG. 8 results in an optical encoder 10 having increased spatial resolution and preserved, constant or even increased photodiode output signal strengths. The spacings or distances between adjacent photodiodes still meet the minimum photodiode separation rule of equalling or exceeding w, while the widths of individual photodiodes still meet the minimum photodiode width rule necessary to produce sufficiently high amplitude output signals of equalling or exceeding y. Moreover, should a slight radial misalignment occur in respect of code strip 30 and photodiode array 20, performance of optical encoder 10 is unlikely to be affected as the separation between adjoining photodiodes is greater than or equal to the minimum spacing w, which is generally limited by the process technology being employed to fabricate photodiode 20 (e.g., CMOS or BiCMOS processes).

Those skilled in the art will now understand that many different combinations, permutations and variations of the novel optical encoder photodiode array spacing and width embodiments described above, but not necessarily disclosed explicitly herein, can be formulated without departing from the spirit and scope of the invention so long as the minimum separation photodiode rule explicated above is not violated.

The various embodiments of the invention solve certain problems and have certain advantages. Cross-talk may be reduced, individual photodiode currents may be boosted, and spatial resolution can be increased. In some embodiments, the size and cost of a single track optical encoder can be maintained or even reduced while increasing the spatial resolution of the encoder. Typically, an integrated circuit in a reflective optical encoder is the single most expensive component in a reflective optical encoder system. The small footprints and sizes permitted by the single track configuration disclosed herein permit small encoders with high resolution to be constructed. Moreover, the area over which light is spread by the emitter and the code scale can be made smaller since the surface areas of the data channel and index channel light detectors can be reduced using the single track light detector disclosed herein. Sensitivity to radial misalignments between the code scale and the light detector is reduced because only one detector track is employed. As a result, misalignments between the code wheel and the light detector are reduced, and manufacturing and assembly costs are reduced because no special equipment is required to align the code scale with the light detector. Some embodiments eliminate complicated electronic circuitry required in the prior art since no additional circuitry must be used to boost or filter current outputs. Various embodiments of the optical reflective encoder also permit much higher resolutions to be achieved than possible heretofore, notwithstanding the smaller size and footprint of the encoder.

The various embodiments are relatively simple and easy to implement, permit the use of smaller light emitting zones than has heretofore been possible, resulting in smaller packages, reduce the sensitivity of the code wheel and the light detector photodiode arrays to misalignment, reduce die and assembly cost, use conventional and simple electronic circuitry, and eliminate the need for circuit redesign.

Note that the terms "X" and "X"/2 appearing in the claims are intended to refer to generic predetermined distances along common axis 15 of code wheel 30 and its corresponding strip of photodiodes or photodetectors 20, and do not necessarily correspond to the somewhat similar notations "X" ", "X"/2", "X"/4", or "X"/8" notation shown in some portions of the Figures. For example, in FIG. 4 there are shown the notations "X"/4" and "X"/2." In the context of FIG. 4, the terms "X" and "X/2" in claims 1, 12 and 23 are intended to refer to the distances "X"/2" and "X"/4", respectively, shown in FIG. 4. In the context of FIG. 5, the terms "X" and "X/2" in claims 1, 12 and 23 are intended to refer to the distances "X"/4" and "X"/8", respectively, shown in FIG. 5. In the context of FIG. 6, the terms "X" and "X/2" in claims 1, 12 and 23 are intended to refer to the distances "X"/4" and "X"/8", respectively, shown in FIG. 6. In the context of FIG. 7, the terms "X" and "X/2" in claims 1, 12 and 23 are intended to refer to the distances "X"/4" and "X"/8", respectively, shown in FIG. 7. In the context of FIG. 8, the term "X" in claims 1, 12 and 23 is intended to refer to the distance "X"/8" shown in FIG. 8.

Included within the scope of the present invention are methods of making and having made the various components, devices and systems described herein.

Various embodiments of the invention are contemplated in addition to those disclosed hereinabove. For example, transmissive optical encoders incorporating the single track and other features of the embodiments described hereinabove are specifically contemplated.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A high resolution single track reflective optical encoder, comprising:
   a light emitter configured to emit light therefrom;
   a plurality of photodetectors or photodiodes having leading and trailing edges arranged along a single track and a common axis to form a single track light detector, the single track light detector having disposed along the common axis pairs of A and A\ data channel light detectors and B and B\ data channel light detectors, the A and B light detectors and the A\ and B\ light detectors, respectively, being arranged to generate output signals that are 90 degrees out of phase with respect to one another, and
   a code scale comprising alternating optically substantially reflective and substantially non-reflective data strips, any pair of adjoining reflective and non-reflective data strips disposed on the code scale having a combined width of X, the code scale being configured to travel along the common axis and being located and configured operably in respect of the single track light detector such that at least a portion of the light emitted from the light emitter is reflected from the code scale towards the data channel light detectors;
   wherein a spacing between at least some adjoining photodetectors or photodiodes arranged along the single track and the common axis is greater than or equal to X/2, the spacing being measured between either the leading edges or the trailing edges of such adjoining photodetectors or photodiodes, the spacing being sufficiently large to prevent or inhibit cross-talk between adjoining photodiodes, the resulting optical encoder having a spatial resolution of X/2.

2. The high resolution single track reflective optical encoder of claim 1, wherein the A and B light detectors are not located adjacent one another anywhere along the common axis and the single track.

3. The high resolution single track reflective optical encoder of claim 1, wherein the A\ and B\ light detectors are not located adjacent one another anywhere along the common axis and single track.

4. The high resolution single track reflective optical encoder of claim 1, wherein widths of individual A and B light detectors are greater than or equal to X/2.

5. The high resolution single track reflective optical encoder of claim 1, wherein widths of individual A\ and B\ light detectors are greater than or equal to X/2.

6. The high resolution single track reflective optical encoder of claim 1, wherein widths of individual A, B, A\ and B\ light detectors range between about 1 microns and about 2 microns.

7. The high resolution single track reflective optical encoder of claim 1, wherein a spacing between adjoining photodetectors or photodiodes arranged along the single track and the common axis is greater than or equal to a width of each of the photodetectors or photodiodes.

8. The high resolution single track reflective optical encoder of claim 1, wherein the photodetectors or photodiodes are arranged along the single track and the common axis to form a sequential pattern or a repeating sequential pattern of photodetectors or photodiodes defined by (A, B, A\, B\).

9. The high resolution single track reflective optical encoder of claim 1, wherein the photodetectors or photodiodes are arranged along the single track and the common axis to form a sequential pattern or a repeating sequential pattern of photodetectors or photodiodes defined by (A, A\, B, B\).

10. The high resolution single track reflective optical encoder of claim 1, wherein the photodetectors or photodiodes are arranged along the single track and the common axis to form a sequential pattern or a repeating sequential pattern of photodetectors or photodiodes defined by (A, B\, A\, B).

11. The high resolution single track reflective optical encoder of claim 1, wherein the photodetectors or photodiodes are arranged along the single track and the common axis to form a sequential pattern or a repeating sequential pattern of photodetectors or photodiodes defined by (A, B, A\, B\).

12. A method of making a high resolution single track reflective optical encoder, comprising:
    providing a light emitter configured to emit light therefrom;
    providing a plurality of photodetectors or photodiodes having leading and trailing edges arranged along a single track and a common axis to form a single track light detector, the single track light detector having disposed along the common axis a plurality of pairs of A and A\ data channel light detectors, and B and B\ data channel light detectors, the A and B light detectors, and the A\ and B\ light detectors, respectively, being arranged to generate output signals that are 90 degrees out of phase with respect to one another;
    providing a code scale comprising alternating optically substantially reflective and substantially non-reflective data strips, wherein any pair of adjoining reflective and non-reflective data strips disposed on the code scale has a combined width equal to X, the code scale being configured to travel along the common axis and being located and configured operably in respect of the single track light detector such that at least a portion of the light emitted from the light emitter is reflected from the code scale towards the data channel light detectors, and
    arranging a spacing between at least some adjoining photodetectors or photodiodes disposed along the single track and the common axis such that the spacing is greater than or equal to X/2, the spacing being measured between either the leading edges or the trailing edges of such adjoining photodetectors or photodiodes, the spacing being sufficiently large to prevent or inhibit cross-talk between adjoining photodiodes, the resulting optical encoder having a spatial resolution of X/2.

13. The method of claim 12, wherein the A and B light detectors are not located adjacent one another anywhere along the common axis and the single track.

14. The method of claim 12, wherein the A\ and B\ light detectors are not located adjacent one another anywhere along the common axis and single track.

15. The method of claim 12, wherein widths of individual A and B light detectors are greater than or equal to X/2n.

16. The method of claim 12, wherein widths of individual A\ and B\ light detectors are greater than or equal to X/2n.

17. The method of claim 12, wherein widths of individual A, B, A\ and B\ light detectors range between about 1 microns and about 2 microns.

18. The method of claim 12, wherein a spacing between adjoining photodetectors or photodiodes arranged along the single track and the common axis is greater than or equal to a width of each of the photodetectors or photodiodes.

19. The method of claim 12, wherein the photodetectors or photodiodes are arranged along the single track and the common axis to form a sequential pattern or a repeating sequential pattern of photodetectors or photodiodes defined by (A, B, A\, B\).

20. The method of claim 12, wherein the photodetectors or photodiodes are arranged along the single track and the common axis to form a sequential pattern or a repeating sequential pattern of photodetectors or photodiodes defined by (A, A\, B, B\).

21. The method of claim 12, wherein the photodetectors or photodiodes are arranged along the single track and the common axis to form a sequential pattern or a repeating sequential pattern of photodetectors or photodiodes defined by (A, B\, A\, B).

22. The method of claim 12, wherein the photodetectors or photodiodes are arranged along the single track and the common axis to form a sequential pattern or a repeating sequential pattern of photodetectors or photodiodes defined by (A, B, A\, B\).

23. A method of encoding light signals generated by an optical encoder having a single track and a common axis, comprising:

emitting light from a light emitter towards a code scale;

reflecting at least a portion of the light emitted by the light emitter from the code scale, the code scale comprising alternating optically substantially reflective and substantially non-reflective data strips, wherein any pair of adjoining reflective and non-reflective data strips disposed on the code scale has a combined width equal to X, the code scale being configured to travel along the common axis;

detecting at least a portion of the light reflected from the code scale with a plurality of photodetectors or photodiodes having leading and trailing edges arranged along the single track and the common axis to form a single track light detector, the single track light detector having disposed along the common axis a plurality of pairs of A and A\ data channel light detectors, and B and B\ data channel light detectors, the A and B light detectors, and the A\ and B\ light detectors, respectively, being arranged to generate output signals that are 90 degrees out of phase with respect to one another, and arranging a spacing between at least some adjoining photodetectors or photodiodes disposed along the single track and the common axis such that the spacing is greater than or equal to X/2, the spacing being measured between either the leading edges or the trailing edges of such adjoining photodetectors or photodiodes, the spacing being sufficiently large to prevent or inhibit crosstalk between adjoining photodiodes, the resulting optical encoder having a spatial resolution of X/2.

* * * * *